UNITED STATES PATENT OFFICE.

HERMAN A. KROBERGER, OF PHILADELPHIA, PENNSYLVANIA, ASSIGNOR TO H. A. KROBERGER & CO., OF SAME PLACE.

IMPROVEMENT IN PROCESSES OF GLOSSING COFFEE.

Specification forming part of Letters Patent No. 173,546, dated February 15, 1876; application filed December 18, 1875.

*To all whom it may concern:*

Be it known that I, HERMAN A. KROBERGER, of the city and county of Philadelphia, Pennsylvania, have invented a new and Improved Process for Glossing Coffee, of which the following is a specification:

The nature of my improvement consists in glossing roasted coffee, while it is hot, with a primary compound of rice-starch and French gelatine, and a strong solution of dextrine.

I roast the coffee in iron cylinders of the usual make, which are revolved in a furnace over a coal fire, till the berry attains a light chestnut-brown, when the coffee passes to the mixer and cooler, where it first receives the primary compound, a little at a time, till the surface of the coffee is slightly covered by agitation. It is then cooled and dried by the admission of air from a blower, and then treated with the dextrine solution.

This primary compound is made as follows: Rice starch, sixteen parts; French gelatine, two parts; water, sufficient quantity. Put the articles named in a suitable vessel with water, and boil until it attains a transparent blue color and the consistency of thick cream. The proportion of priming compound used will depend upon the quantity of coffee glossed. A strong mucilage of dextrine is now applied as the finishing process. The solution is put on in small quantities at a time and agitated, and the application continued until the coffee is completely covered, when it is dried, as described above in the primary process. The dextrine solution readily unites with the starch and gelatine compound previously put on, and forms a tenacious air-tight covering with a beautiful gloss. It is applied in such proportions as the quantity of coffee to be glossed requires.

The advantages of this process are threefold—viz., the percentage of loss in roasting is less, the evaporation of the aroma of the berry is prevented, and the appearance of the coffee improved.

I am aware that coffee has been heretofore covered with gelatinous matter for the purpose of preserving its aroma; but

What I claim is—

The process of glossing coffee by first priming it with starch and gelatine, and then covering this with a mucilage of dextrine, the latter uniting with the priming to form a tenacious coat, as set forth.

HERMAN A. KROBERGER.

Witnesses:
 PETER HAY,
 D. I. CHAPMAN.